UNITED STATES PATENT OFFICE.

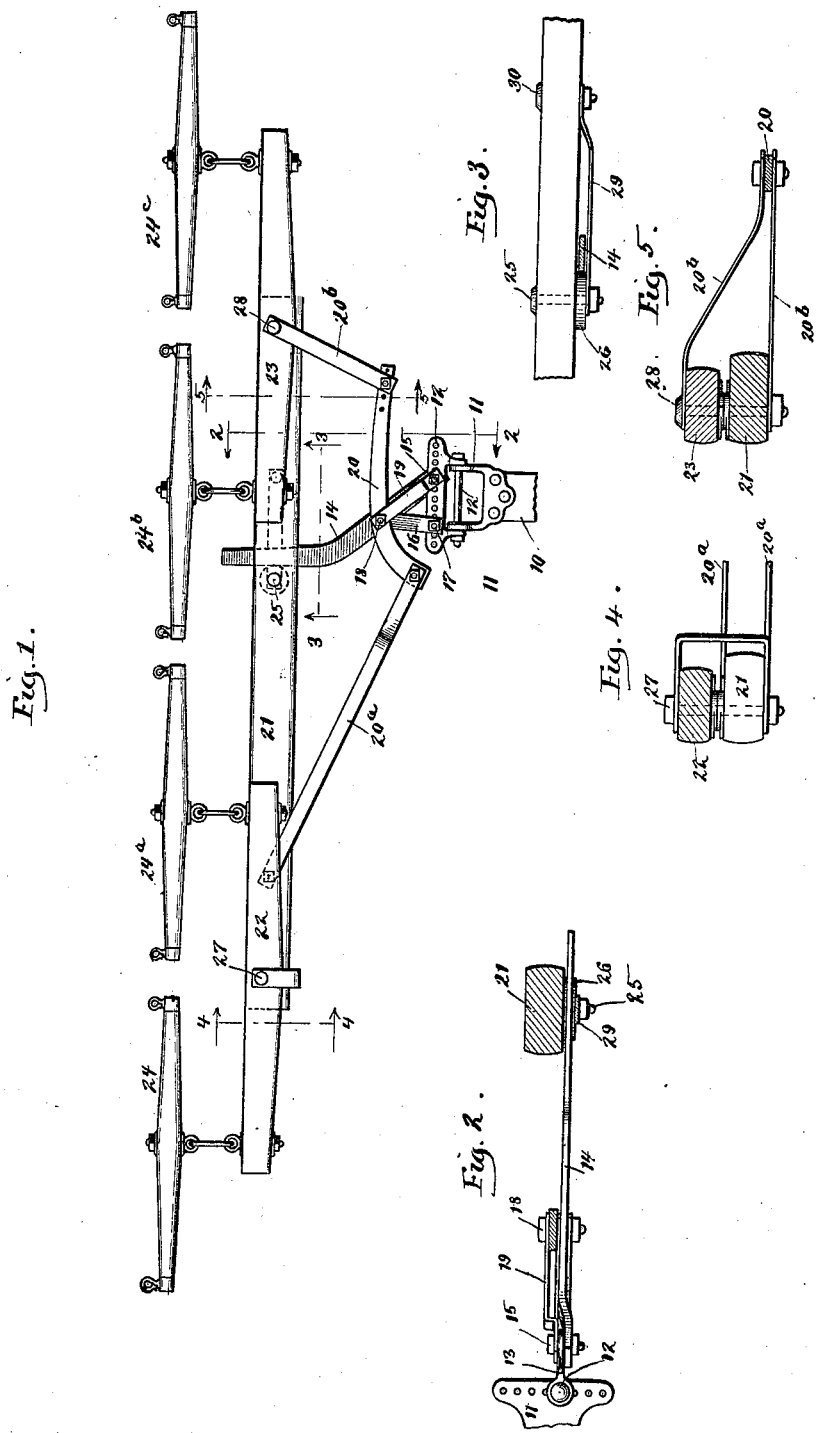

WILLIAM SOBEY, OF RACINE, WISCONSIN, ASSIGNOR TO THE J. I. CASE PLOW WORKS, OF SAME PLACE.

DRAFT-EQUALIZER.

SPECIFICATION forming part of Letters Patent No. 552,304, dated December 31, 1895.

Application filed September 11, 1895. Serial No. 562,175. (No model.)

*To all whom it may concern:*

Be it known that I, WILLIAM SOBEY, of the city and county of Racine, State of Wisconsin, have invented certain new and useful Improvements in Draft-Equalizers, of which the following is hereby declared to be a full, clear, and exact description.

The invention relates to whiffletree attachments now in familiar use and which are designed to distribute the power from the team, so that where three or more horses are pulling abreast the several draft-animals may each possess an equal leverage and the load be drawn along in a straight line. To keep a uniform width of furrow in working with gang or sulky plows it is requisite that the implement advance in true course, running neither to nor from "land." This result is difficult to accomplish, especially when the plow is drawn by a team hitched four abreast. With one horse tracking in the open furrow and the others walking upon the sod or unplowed ground the team stands in offset relation to the median line of advance at the plow-beam.

The present invention aims to correct the irregularities in draft due to the offset position stated; and it consists of certain improvements in structure, as set forth by description, and more particularly pointed out by claims at the conclusion thereof.

In the drawings like parts have like designation throughout.

Figure 1 is a plan view of a "four-abreast" equalizer made according to the invention as applied to a right-hand plow. Figs. 2, 3, 4 and 5 are section views at lines 2 2, 3 3, 4 4 and 5 5 of Fig. 1, respectively.

As here shown, the plow-beam 10 carries the familiar vertical clevis 11 and horizontal clevis 13 secured thereto by cross-bolt 12. Series of holes in the clevises allow for change in adjustment to vary first the depth and second the width of the furrow in ordinary fashion. Projected forward from the plow-beam is the short tongue 14, bolted, as at 15, to clevis 13 and held rigidly against lateral sway by counter-brace 16 bolted at 17 to clevis 13 and at its other extremity to the tongue by king-pin 18. A companion tie-piece 19 for the tongue is retained above the same by bolts 15 18, while between said parts an evener 20 is received, being fulcrumed upon king-pin 18. Obviously said pin is the hitch-point for application of the team power and is in the draft-line directed from the center of resistance at the plow-bottom. The evener-arms are of unequal length and near opposite terminals are united by the pairs of pivotal links $20^a$ $20^b$ to the main cross-tree 21.

It will be noted that tongue 14 at its forward end is slightly offset toward the landside from king-pin 18, but with its edge practically straight and in relation substantially parallel with the draft-line. This straight edge of tongue 14 affords a pivot-bearing for bolt 25 secured to the cross-tree 21 and having a friction-roll 26 thereon, Fig. 3. A strap 29 fastened by bolts 25 30 to the cross-tree, beneath tongue 14, holds the parts in snug relation and yet permits the cross-tree with its adjuncts to ease about pivot 25 26 as the team progresses and to swing readily in turning the corners of the field.

The short arm of evener 20 may be curved slightly to the rear, as shown, so that the draft of links $20^a$ is applied to better advantage, and at its opposite terminal said evener provides for variable adjustment of links $20^b$ thereon to more nicely balance the action of the cross-tree 21, for it will be observed that the arms of said cross-tree, measured from fulcrum 25 26 to the points of application for links $20^a$ $20^b$ thereon, are in counter relation to the arms of evener 20, the purpose being to insure a substantial equipoise of the whole system about king-pin 18 as a point of suspension.

Near opposite ends the cross-tree 21 carries the doubletrees 22 23, to which are attached in turn the singletrees 24, $24^a$, $24^b$ and $24^c$, the single-tree $24^c$ being for the furrow-horse. The same bolt 28 which swivels the links $20^b$ to the cross-tree may serve conveniently to sustain the adjacent doubletree 23.

Owing to the offset relation of cross-tree 21 at its fulcrum-bearing 25 26 upon tongue 14, the obvious tendency is for the cross-tree to crowd at its fulcrum 25 against tongue 14 in endeavor to range itself in the line of draft passing forward through king-pin 18. The tongue being rigid laterally resists the thrust of the cross-tree and yet because of its connection compels the plow to respond thereto, the tendency being to run the plow-point slightly away from land. By proper adjustment of bolts 15 17 at horizontal clevis 13 the king-pin 18 with tongue 14 can be shifted sidewise, so that despite the tendency referred to its effect is neutralized and the plow held true to cut a furrow of uniform width. Having thus set the tongue 14 in desired position, it is plain that the thrust of the cross-tree 21 thereon remains uniform—that is, the edge-bearing at tongue 14 against which the cross-tree fulcrum 25 26 abuts maintains said fulcrum at substantially unchanging distance from the line of draft. Hence it is that the cross-tree with its adjuncts keeps trim and steady in working position since there is no lateral shift of the fulcrum 25 to and fro with reference to the draft-line. At the same time the pivotal play of the cross-tree system is free and ample at fulcrum 25 for effective action as an equalizer.

Obviously the details of structure can be varied according to the skill of the mechanic without departing from the essentials of the invention. Thus for a left-hand plow the relations of the cross-tree, the evener, the connecting-links and the tongue would be reversed. Like changes will suggest themselves for adapting the equalizer to use in other relations. Tongue 14 can be projected at inner side of clevis 12 and extends straight to cross-tree fulcrum 25 26, while king-pin 18 for the evener would remain sustained as usual by counter-brace 16 and tie-piece 19.

What I claim as new, and desire to secure by Letters Patent, is—

1. In equalizers, the combination with the tongue rigidly offset from the line of draft, the evener fulcrumed thereon and having arms of different length, the cross-tree bearing pivotally against the tongue at its offset and having arms of counter proportion to the arms of the evener, the double-trees carried at opposite ends of said cross-tree and the links uniting the cross-tree arms with the reverse arms of the evener, substantially as described.

2. In equalizers, the combination with the tongue rigidly offset from the line of draft, the evener fulcrumed thereon and having arms of different length, the cross-tree bearing pivotally but with sliding play against the tongue and having arms of counter proportion to the arms of the evener, the double-trees carried at opposite ends of said cross-tree and the links uniting the cross-tree arms with the reverse arms of the evener, substantially as described.

WILLIAM SOBEY. [L. S.]

Witnesses:
HENRY MITCHELL WALLIS,
CHRISTOPHER C. GITTINGS.